United States Patent
Martinez

(10) Patent No.: US 7,181,107 B2
(45) Date of Patent: Feb. 20, 2007

(54) INTEGRATED OPTICS COUPLING ELEMENT COMPRISING A GRATING CREATED IN A CLADDING AND ITS FABRICATION METHOD

(75) Inventor: Christophe Martinez, Grenoble (FR)

(73) Assignee: Teem Photonics, Meylan (FR)

( * ) Notice: Subject to any disclaimer, the term of this patent is extended or adjusted under 35 U.S.C. 154(b) by 0 days.

(21) Appl. No.: 10/538,139

(22) PCT Filed: Dec. 15, 2003

(86) PCT No.: PCT/FR03/50171

§ 371 (c)(1),
(2), (4) Date: Jun. 9, 2005

(87) PCT Pub. No.: WO2004/057390
PCT Pub. Date: Jul. 8, 2004

(65) Prior Publication Data

US 2006/0029330 A1    Feb. 9, 2006

(30) Foreign Application Priority Data

Dec. 16, 2002   (FR) ................................. 02 15920

(51) Int. Cl.
*G02B 1/01* (2006.01)
*G02B 1/295* (2006.01)
*G02B 6/10* (2006.01)

(52) U.S. Cl. .................. 385/37; 385/1; 385/4; 385/10; 385/129; 385/130; 385/132

(58) Field of Classification Search .............. 385/1–10, 385/37, 129–132, 14, 30; 439/29, 31
See application file for complete search history.

(56) References Cited

U.S. PATENT DOCUMENTS 4,938,836 A    7/1990  Carenco et al. ................. 117/8

(Continued)

FOREIGN PATENT DOCUMENTS

EP    0 285 499    10/1988

(Continued)

OTHER PUBLICATIONS

Veasey et al., "Arrays of Distributed-Bragg-Reflector Waveguide Lasers at 1536 nm in Yb/Er Codoped Phosphate Glass," *Applied Physics Letters*, vol. 74, No. 6, Feb. 8, 1999, pp. 789-791.

Primary Examiner—Brian Healy
Assistant Examiner—Charlie Peng
(74) Attorney, Agent, or Firm—Pillsbury Winthrop Shaw Pittman, LLP

(57) ABSTRACT

The invention relates to an integrated optics coupling element that includes a substrate, an optical guide core, an optical cladding independent of the core and surrounding at least one portion of the core in a zone of the substrate called the zone of interaction. The cladding has at least in the zone of interaction a modulation of its structure so as to form a grating. The refractive index of the cladding is different from the refractive index of the substrate and lower than the refractive index of the core at least in the part of the cladding next to the core in the zone of interaction.

Embodiments of the invention may be used to make gain flatteners for optical amplifiers or to make linear response filters whose wavelength is on a spectral band.

18 Claims, 5 Drawing Sheets

U.S. PATENT DOCUMENTS

| | | | |
|---|---|---|---|
| 5,043,991 A | 8/1991 | Bradley | 372/32 |
| 6,104,852 A | 8/2000 | Kashyap | 385/123 |
| 6,141,465 A * | 10/2000 | Bischel et al. | 385/4 |
| 6,842,544 B2 * | 1/2005 | Eldada | 385/10 |
| 6,882,776 B2 * | 4/2005 | Ovadia et al. | 385/37 |
| 2006/0098911 A1 * | 5/2006 | Sandhu et al. | 385/8 |

FOREIGN PATENT DOCUMENTS

JP        2001-133649        5/2001

* cited by examiner

INTEGRATED OPTICS COUPLING ELEMENT COMPRISING A GRATING CREATED IN A CLADDING AND ITS FABRICATION METHOD

This application is the National Stage of International Application No. PCT/FR2003/050171, filed Dec. 15, 2003, which claims priority to French Application No. 02/15920, filed Dec. 16, 2002, the entire contents of both applications being hereby incorporated by reference.

FIELD

The invention relates to an integrated optics coupling element comprising an optical grating created in a cladding, and to a method for manufacturing the same.

Embodiments of the invention have applications in all fields, in which a coupling between an optical cladding and a guide core or vice versa is desired, and in particular in the field of spectral filtering. Embodiments of the invention may be used to create gain flatteners for optical amplifiers in the telecommunications field or to create linear response filters whose wavelength is on a spectral band defined for the spectral recognition, in particular for the measurement of spectral offsets from a power variation for example in the field of sensors.

BACKGROUND

Grating coupling elements may be created in optical fiber claddings. In this field, the optical cladding of a fiber traditionally surrounds the fiber core and has a refractive index lower than that of the core to allow the propagation of a light wave in the core. Conjointly, the optical cladding permits the mechanical support of the core. The fiber core may not exist without the cladding.

Furthermore, the grating created in the fiber permits one or more guided modes to be coupled in the core of a fiber to one or more fiber cladding modes or vice versa.

C. Y. Lin and L. A. Wang, "Loss-tunable long period fibre grating made from etched corrugation structure," Electron. Lett., 35 (21), (1999), pp. 1872–1873, illustrates a grating coupling element obtained by etching the cladding. However, the manufacturing process of this type of grating may be complex. For example, it may require the cladding to be etched, which may render the fiber fragile.

FIG. 1 shows a perspective view of an example of a coupling element in an optical fiber. The fiber 1 comprises a core 3 (shown in dotted lines) and a cladding 5; the latter has been etched Λ to create a grating R having a period Λ. The mechanical rigidity of the fiber may be modified by the etching 7 created in the cladding 5.

Furthermore, as the core of a fibre may not exist without the optical cladding, this dependence may restrict the possibilities of modifying the parameters of the cladding, and the gratings, as well as solutions for the design, architecture and integration of the coupling elements in complex systems.

SUMMARY

Embodiments of the invention have applications in all fields, in which a coupling between an optical cladding and a guide core or vice versa is desired, and in particular in the field of spectral filtering. Embodiments of the invention may be used to create gain flatteners for optical amplifiers in the telecommunications field or to create linear response filters whose wavelength is on a spectral band defined for the spectral recognition, in particular for the measurement of spectral offsets from a power variation for example in the field of sensors.

Embodiments of the invention include a coupling element comprising an optical grating created in a cladding by modulation of the cladding structure as well as its creation process. Embodiments of the invention provide a flexible fabrication process for defining the modulation of the cladding structure and an element that is not fragile.

Embodiments of the invention include a coupling element comprising a grating included in a cladding that is independent of the guide core to which it is associated. By independence of the core and the cladding, it is meant that the core and the cladding may exist in a substrate independently from one another. In other words, the core may exist without the cladding and the cladding may exist without the core.

More precisely, the integrated optics coupling element of the invention comprises in a substrate an optical guide core, an optical cladding independent of the core and surrounding at least one portion of the core in a zone of the substrate called the zone of interaction, in which the cladding has at least in the zone of interaction a modulation of its structure so as to form a coupling grating between the guide core and the optical cladding, in which the refractive index of the cladding is different from the refractive index of the substrate and lower than the refractive index of the core, at least in the part of the cladding next to the core in the zone of interaction.

By surrounding, it is meant that the fundamental mode profile of the guide core has a maximum that is included in the index profile of the cladding. In this way, the fundamental mode profile of the core may be completely or partially included in the cladding index profile, which results at structural level in a core positioned anywhere in the cladding including at its edge in which case the core may be partially outside of the cladding.

The zone of interaction corresponding to a grating coupling zone in a substrate may also be termed "artificial cladding grating" (ACG). In this zone, the cladding is artificially created in the substrate and independently of the core.

The grating formed from the cladding is configured to couple the one or more core modes to one or more cladding modes or vice versa.

In a first embodiment, the modulation of the cladding structure is a modulation of its section and preferably of its width, considered in a direction perpendicular to the direction of propagation of the modes.

In a second embodiment, which may be combined with the first embodiment, the modulation of the cladding structure is a modulation of the position of the cladding with respect to the core.

The fabrication of the integrated optics cladding may be obtained by a modification of the refractive index of the substrate, in particular by implantation or ionic exchange. Consequently, the modulation of the cladding structure may be obtained without etching or fusion.

The solution of the invention therefore offers benefits such as the simplicity of creation and sturdiness of the coupling element.

Furthermore, the independence between the core and the cladding allows a higher number of combinations to be created by varying not only the size of the cladding but also the position of the core in the cladding. The independence of the cladding and the core also permits easy integration of the coupling element into a complex architecture.

The grating in accordance with embodiments of the invention may comprise one or more elementary gratings, each elementary grating creating an elementary zone of interaction.

The effective index $n^0_{eff}$ of the mode propagating in the core depends on the surrounding medium. According to the cladding index and its extent in the substrate, the value of the effective index of the core mode changes. In this way, by periodically or pseudo-periodically modulating the cladding structure, this variation may be transmitted to the effective index value of the core, and thus, may induce a coupling between the one or more core modes and the one or more cladding modes and in this way create a grating.

The use of the modulation of the cladding structure is particularly beneficial to create a grating. Indeed, one of the factors that may restrict the parameter adjustment of the coupling coefficient desired for the grating is provided, in the case of masks being used, by the size of the minimum pattern of the mask lithography permitting the gratings to be created. As this limit is identical for the core and the cladding, it will be appreciated that it is easier to obtain slight variations on $n^0_{eff}$ by varying the structure of the cladding. Consequently, grating type component applications, in particular apodized, are thus favored.

In a first embodiment, the grating formed by the modulation of the cladding structure is an apodized grating.

In a second embodiment, the grating formed by the modulation of the cladding structure is a chirped grating.

The cladding structure may have an influence on the effective index of the core mode. However, the value of the resonance wavelength of the ACG for a coupling from the 0 mode of the core to the j mode of the cladding depends on the effective index values as shown by the following equation:

$$\lambda_{0j} = \Lambda \times (n^0_{eff} - n^j_{eff}) \quad (1)$$

$\Lambda$ is the period of the grating.

A variation in the size of the cladding and/or de its position with respect to the core therefore permits the value of $\lambda_{0j}$ to be changed.

Coupling the core to the cladding (the same approach may be used for coupling the cladding to the core), results in a transfer of energy between the guided mode of the core and that of the cladding for wavelengths of $\lambda_{0j}$. The energy coupled in the cladding modes is then guided in the cladding generally with losses.

It is desirable to adjust the parameters of $\Lambda$ and/or the distribution of the effective indices of the various modes to modify $\lambda_{0j}$.

The efficiency of the coupling between the modes may depend on the length of the grating and the coupling coefficient $K_{0j}$ between the 0 and j modes. This coefficient is provided by the spatial recovery integral of the 0 and j modes, weighted by the index profile induced by the grating. We therefore have a relationship of the type:

$$K_{0J} \propto \int\int \xi_0 \cdot \xi_j^* \cdot \Delta n \, ds \quad (2)$$

where:

$\xi_0$ and $\xi_j$ are the transversal profiles of the 0 and j modes and $\xi_j^*$ is the complex conjugate of $\xi_j$ $\Delta n$ is the amplitude of the effective index modulation induced by the grating in a plane perpendicular to the direction of propagation of the wave, ds is an integration element in a plane perpendicular to the axis of propagation of the wave.

The modification of $K_{0j}$ is obtained by varying the profile of the modes and/or the index profile induced by the grating, for example, by varying the opto-geometrical characteristics of the cladding and/or of the core (dimensions, index level, etc.) and/or the characteristics of the grating ($\Delta n$, position of the grating with respect to the core and to the cladding, etc.).

With respect to the cladding, the larger its dimensions and index level, the more cladding modes will be allowed to propagate and the more spectral filtering bands will be possible. This may be a benefit if multiple filtering is desired or if more flexibility in the selection of a filtering mode is desired.

In order to limit the number de cladding modes that can be coupled, it is of interest on the contrary to reduce the opto-geometrical dimensions of the cladding.

With respect to the core, its dimensions and index level may determine the characteristics of the mode, which propagates. Furthermore, the more the index differences between the core, the cladding and the substrate are high, the more there will be potentially a chance of having couplings for low grating periods as shown by the equation (1) (at a wavelength of given resonance, the period is inversely related to the index difference between the guided mode of the core and the cladding mode).

By modifying the position of the core, the grating and the cladding, different couplings may be generated. Indeed, equation (2) shows that the coupling force/coupling efficiency depends on the relative position in the plane transversal to the axis of propagation of the profiles of the cladding mode, of the guided mode of the core and the grating.

In particular, from the equation (2), it can easily be shown that a decentration $\delta x$ of the core with respect to the cladding increases K.

Also, in one embodiment of the invention the core of the coupling element is totally or partially decentred with respect to the cladding.

Spectral band refers to a band with a set of wavelengths whose central wavelength and bandwidth are determined, given that a light wave may comprise one or more several spectral bands.

In embodiments of the invention, the cladding and the core exist independently from one another in the substrate. This independence permits more flexibility in the creation of the coupling element. In particular, the core may no longer be situated in the cladding outside of the zone of interaction but solely in the substrate which permits the optical isolation of the core. In this way, the cladding may only influence the propagation of a light wave in the associated guide core in the part surrounding the core and the cladding may guide or transport light waves independently of the core.

The substrate may be made using a single material or by superposition of several layers of materials. In this case, the refractive index of the cladding is different from the refractive index of the substrate at least in the layers next to the cladding.

In an embodiment, each elementary cladding has a refractive index higher than that of the substrate.

In embodiments of the invention, the guide may be a planar guide when the light is confined in a plane containing the direction of propagation of the light or a micro guide, when the light is confined in two directions transversal to the direction of propagation of the light.

The grating may be formed by an elementary grating or a set of elementary gratings in series. The characteristics of the zone of interaction of the coupling element are such that they permit the desired light spectrum to be obtained at the output of this element.

In one preferred embodiment, the cladding and/or the guide core, may be created by any type of technique which permits the refractive index of the substrate to be modified. In particular, the ion exchange techniques, ionic implantation and/or radiation, for example, by laser exposure or laser photo inscription, or a layer deposition process may be used.

The technology of ion exchange in glass is particularly interesting but other substrates apart from glass may be used such as for example crystalline substrates of the KTP, $LiNbO_3$ or even the $LiTaO_3$ type.

When the cladding is created from a mask, the grating pattern may be obtained by the same mask.

Embodiments of the invention also relate to a method for fabricating an integrated optics coupling element as previously defined, the cladding and the guide core being respectively created by modification of the refractive index of the substrate so that at least part of the cladding next to the core and at least in the zone of interaction, the refractive index of the cladding is different from the refractive index of the substrate and lower than the refractive index of the core and so that the cladding in the zone of interaction comprises a modulation of its structure capable of forming the grating.

In one preferred embodiment, the method of the invention comprises the following acts:

a) introduction of a first ionic species in the substrate to permit the optical cladding to be obtained after act c), b) introduction of a second ionic species in the substrate to permit the guide core to be obtained after act c), c) burying of the ions introduced in acts a) and b) to obtain the cladding and the guide core, It will be appreciated that the order of the acts may be inverted.

The first and/or the second ionic species may be introduced by an ionic exchange, or by ionic implantation.

The first and second ionic species may be the same or different.

The introduction of the first ionic species and/or the second ionic species may be made with the application of an electrical field.

In the case of an ionic exchange, it is desirable that the substrate contain ionic species capable of being exchanged.

According to one preferred embodiment, the substrate is made of glass and contains $Na^+$ ions introduced beforehand, the first and second ionic species are $Ag^+$ and/or $K^+$ ions.

In a first embodiment, act a) comprises the creation of a first mask comprising a pattern capable of creating the cladding, the first ionic species being introduced through this first mask and act b) comprises the elimination of the first mask and the creation of a second mask comprising a pattern capable of creating the core, the second ionic species being introduced through this second mask.

In an embodiment, the first mask comprises a pattern whose structure is modulated to obtain the desired structure modulation of the cladding permitting the grating to be formed.

In another embodiment, the first mask comprises a uniform pattern, in which the modulation of the cladding structure is obtained after elimination of the first mask by local heating of the cladding, by any known means.

In a second embodiment, act a) comprises the creation of a mask comprising a pattern configured to create the cladding and the core, the introduction of the first and the second ionic species of act a) and b) being carried out through this mask; the modulation of the cladding structure may be obtained in this case by local heating.

The masks used in the invention may be made of aluminum, chrome, alumina or dielectric material.

In a first embodiment, in act c), the first ionic species is buried at least partially prior to act b) and the second ionic species is buried at least partially after act b).

According to a second embodiment, in act c), the first ionic species and the second ionic species are buried simultaneously after act b).

According to a third embodiment, in act c), the burying comprises the depositing of at least one layer of refractive material, whose index may be lower than that of the cladding, on the surface of the substrate.

This mode may be combined with the two previous modes.

In an embodiment, at least part of the burying is carried out with the application of an electrical field.

In an embodiment, prior to burying with an electrical field and/or the depositing of a layer, the process of the invention may comprise among others burying by re-diffusion in an ionic bath.

The re-diffusion may be carried out partially prior to act b) to re-diffuse the ions of the first ionic species and partially after act b) to re-diffuse the ions of the first and second ionic species. This re-diffusion may also be carried out completely after act b) to re-diffuse the ions of the first and second ionic species.

By way of example, this re-diffusion is obtained by plunging the substrate in a bath containing the same ionic species as that previously contained in the substrate.

Other characteristics and benefits of the invention will be discussed in the following description, in reference to the figures of the appended drawings. This description is given by way of illustration and is not restrictive.

DETAILED DESCRIPTION

FIGS. 2 to 7 show examples of embodiments of coupling elements in cross sections containing the direction of propagation x of the light waves in the core of the element. In FIGS. 2 to 7, the direction of propagation is in a same plane. However, it will be appreciated that the element core may be buried at variable depths.

Figure 1:
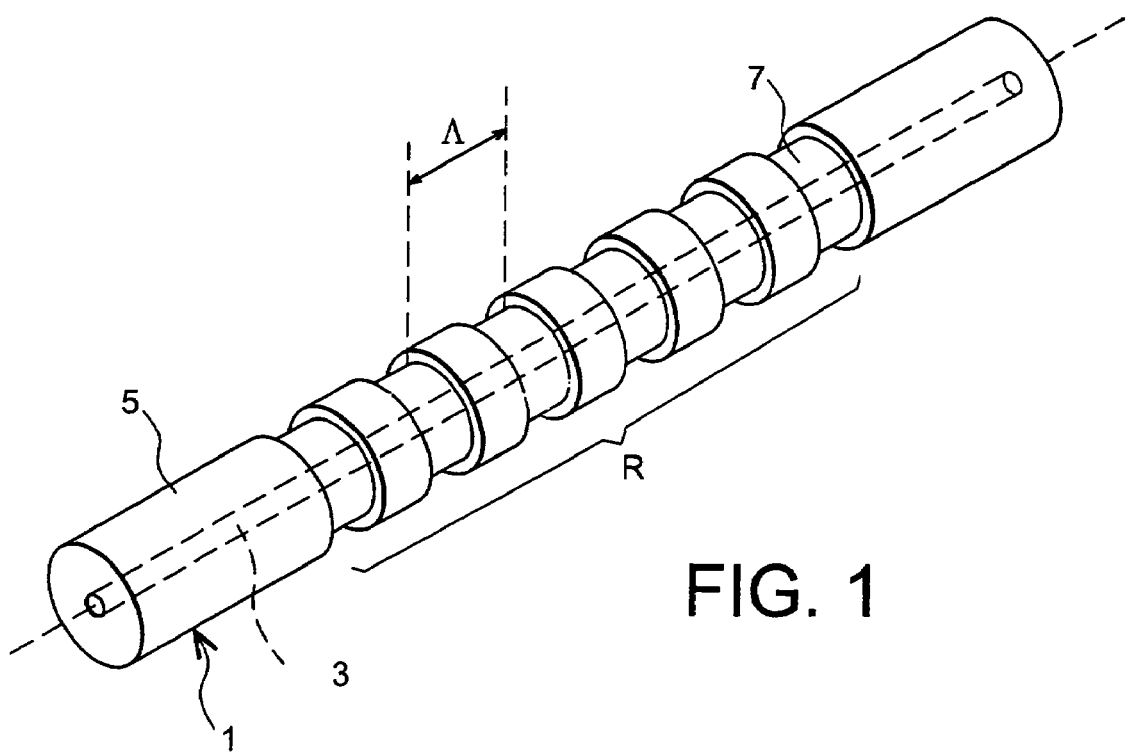
FIG. 1 schematically shows an optical fiber comprising a grating created by etched grooves in the cladding.
Figure 2:
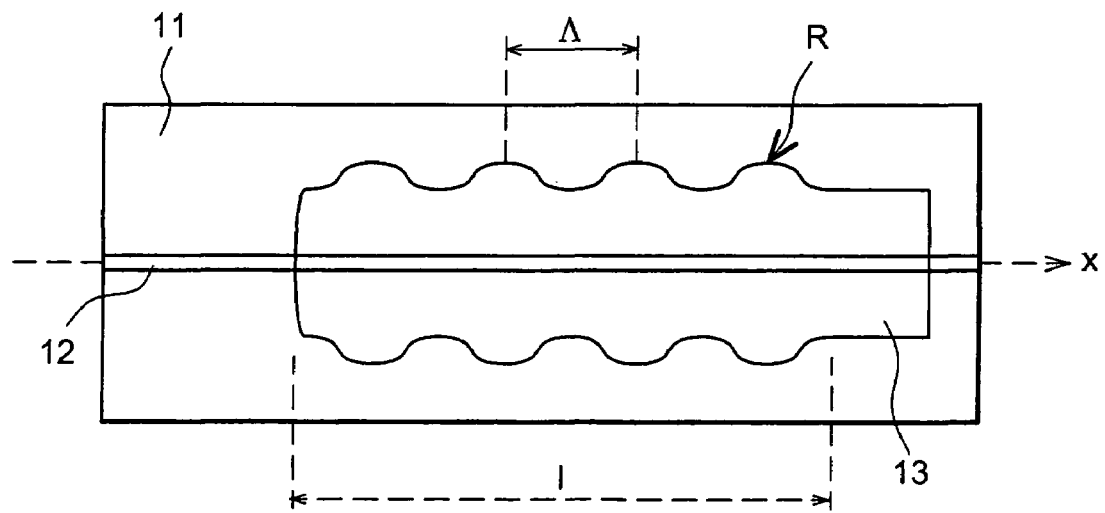
FIG. 2 shows a schematic cross section of a coupling element in accordance with an embodiment of the invention.

FIG. 2 shows diagrammatically a cross section of a coupling element in accordance with an embodiment of the invention.

This figure shows a substrate 11 including a cladding 13 and a core 12. The cladding 13 comprises a modulation of its width (considered in a direction y perpendicular to the direction of propagation x) in a zone I of the cladding, which may be referred to as the zone of interaction. This width modulation creates a grating R with a pitch $\Lambda$ configured to couple one or more core propagation modes to one or more cladding propagation modes or vice versa.

The core exists independently of the cladding. It has a constant section and in this example traverses the cladding and in particular the zone of interaction I.

In this example, the cladding has a section which varies sinusoidally with the pitch $\Lambda$. To simplify this figure, only four grating periods have been shown.

Figure 3:
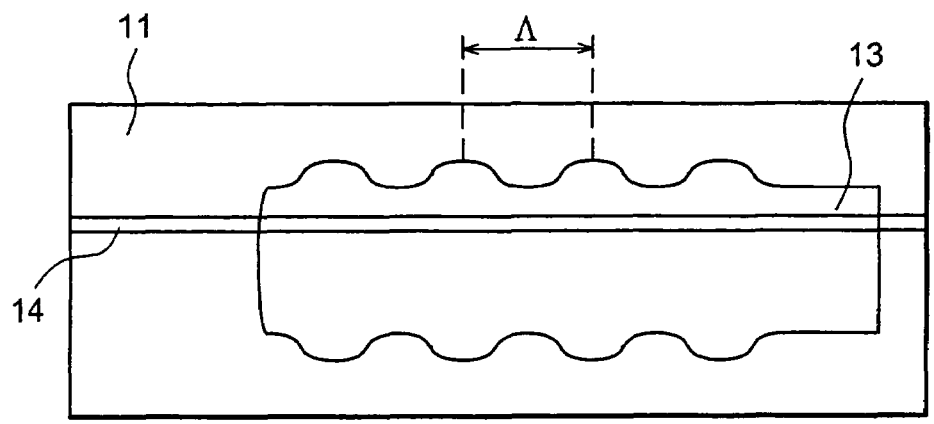
FIG. 3 shows a schematic cross section of a coupling element in accordance with an embodiment of the invention.

FIG. 3 shows diagrammatically a cross section, a variant of an embodiment of the coupling element of FIG. 2. This element differs from that of FIG. 2 by a core 14 which is decentered with respect to the axis of symmetry of the cladding in the direction x. In this embodiment, a parameter element related to the coupling coefficient between the cladding and the core by the grating may be added.

Figure 4:
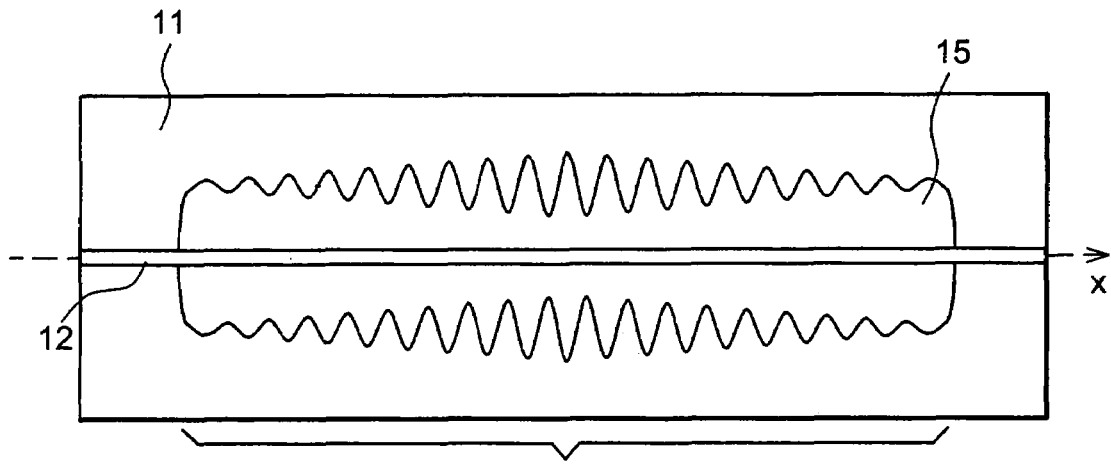
FIG. 4 shows a schematic cross section of a coupling element in accordance with an embodiment of the invention.

FIG. 4 shows diagrammatically a cross section, a second example of an embodiment of a coupling element of the invention.

As in FIG. 2, this coupling element comprises in a substrate 11, a core 12 which traverses the cladding 15 in its axis of symmetry considered in the direction x.

The cladding also has a modulation of section, creating a grating R. In this example, the grating is an apodized grating. Indeed, the pseudo-sinusoidal pattern of the grating is not constant and decreases at both ends. In an apodized grating, the disruption which generates the coupling phenomenon in the zone of interaction I appears and progressively disappears along the propagation of the one or more modes.

The variation of section of the cladding induces disruptions whose consequences may be much less important than in the case of the variation of the core section (in particular due to the dimensions of the cladding). The modulation of the section of the cladding of the invention thus makes apodization easier.

Figure 5:
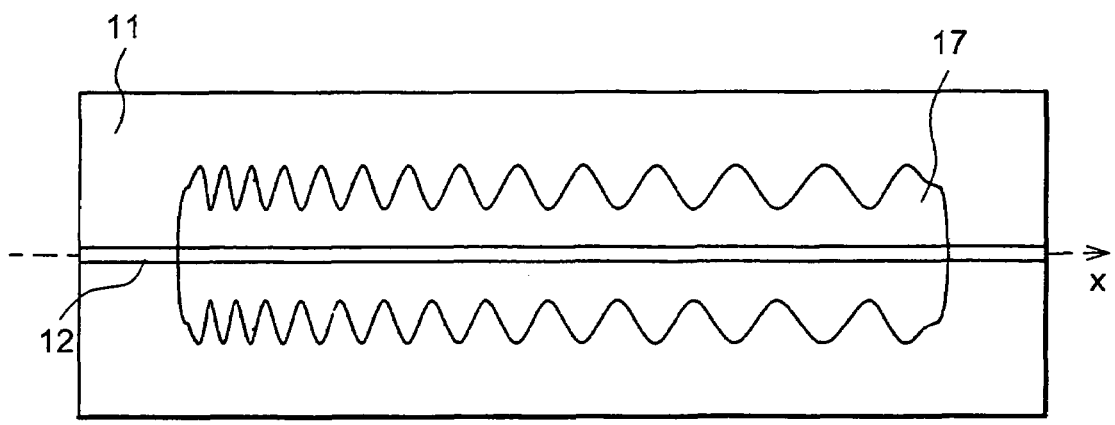
FIG. 5 shows a schematic cross section of a coupling element in accordance with an embodiment of the invention.

Other artificial cladding gratings may be created from a variation of the cladding structure. By way of example, FIG. 5 shows a chirped type grating for which the pitch of the section modulation of the cladding 17 evolves. The other elements of this figure are the same as those of FIG. 4 and have the same references.

It is also possible to combine the different examples of embodiments of the coupling element of the invention and create for example a grating that is both chirped and apodized.

It may be difficult to create apodized or chirped gratings by etching, especially for apodization which may require good control, distributed along the length of the grating, of the cladding variation. The use of gratings created according to the invention is particularly beneficial.

Figure 6:
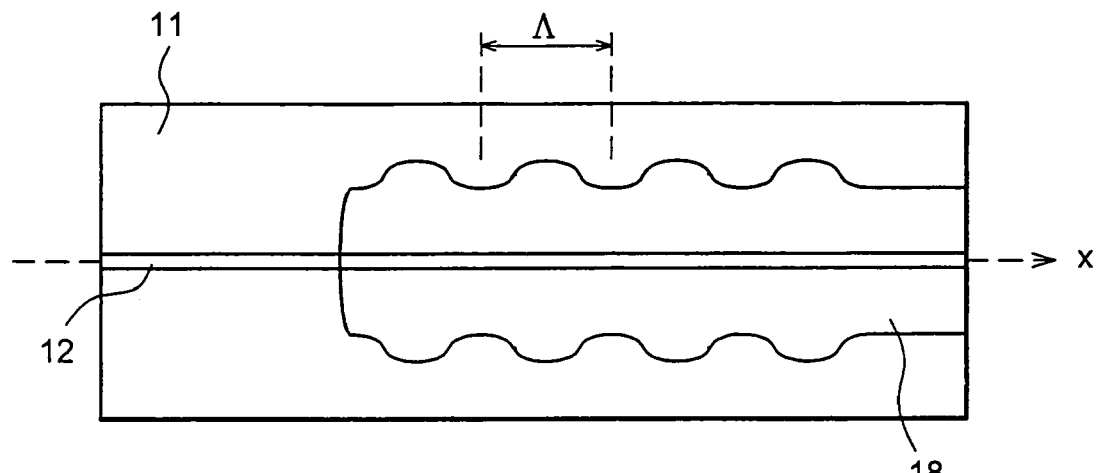
FIG. 6 shows a schematic cross section of a coupling element in accordance with an embodiment of the invention.

FIG. 6 shows diagrammatically a cross section of a coupling element in accordance with an invention in which the modulation of the cladding structure is created by modulation of the position of the cladding with respect to the core.

In this figure, the substrate 11 includes a cladding 18 that is traversed by the core 12.

In this example, the section of the cladding is constant but its position in the cross section plane of the figure follows with respect to the axis x, a sinusoidal function of period $\Lambda$.

It will be appreciated that these different embodiments of the invention may be combined with one another.

In an embodiment of the invention, the fabrication of the grating by modulation of the cladding structure permits a core with a constant section to be created. This is of particular interest when the coupling element is integrated into a more complex architecture. In this case, the coupling element is associated with the rest of the component by creating simply the cladding in a zone of the substrate comprising the core, which permits the operation of the component to be checked without the artificial cladding grating without having to make another mask for the part of the core that is associated with the zone of interaction.

Figure 7:
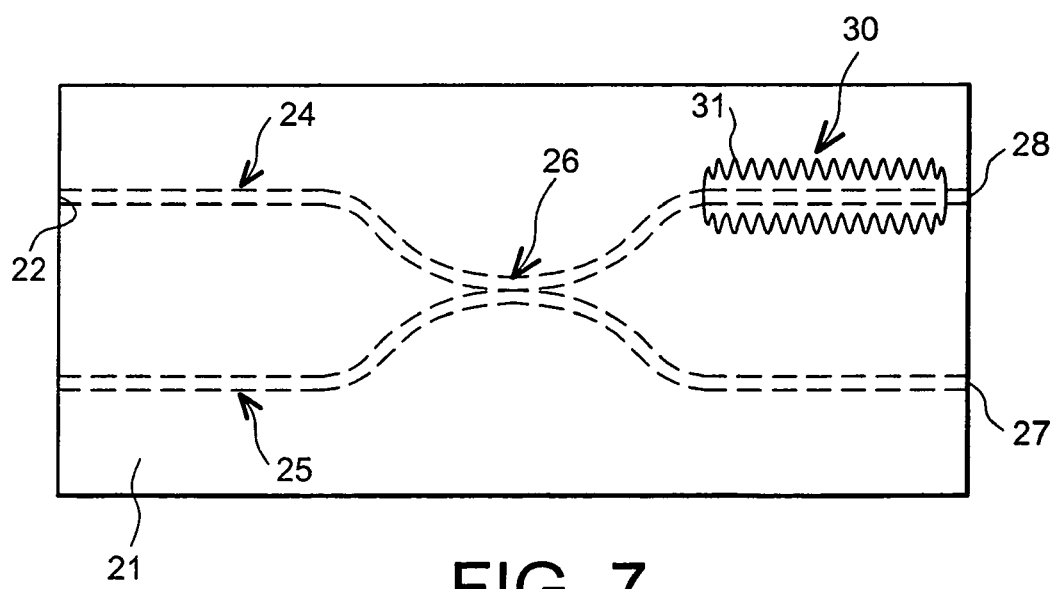
FIG. 7 shows a schematic cross section of the coupling element in accordance with an embodiment of the invention, FIGS. 8a to 8d schematically show a method for manufacturing the coupling element in accordance with an embodiment of the invention, FIGS. 9a and 9b schematically show a method for manufacturing the coupling element in accordance with an embodiment of the invention.

By way of example, FIG. 7 shows a coupling element that is integrated into an optical architecture. In this example the architecture is an integrated optics coupler in a substrate 21.

The coupler comprises in the substrate 21, two guide cores 24 and 25 which are close to one another in a coupling zone 26 in order to permit an energy exchange from one of the guides to the other and vice versa. The core 24 is associated among others after the coupling zone with a coupling element 30 of the invention. This coupling element is formed for example by a cladding 31 comprising a modulation of its section and by the part of the core 24 which traverses the cladding.

Thus, when a light wave penetrates the core 24 by one end 22, it is first split in the coupling zone into two parts, one part of the wave continues to be transported by the guide 24 while the other part is transported by the core 25. The part of the wave transported by the core 24 is filtered by the coupling element 30 before leaving the end 28 of the guide. The end 27 of the coupler directly transmits the part of the wave coupled by the coupling zone in the core 25. At the output, a filtered signal and a reference signal may be obtained.

One application of the component of FIG. 7 may be for example a spectral detection system. In fact, if the coupling element 30 has a wavelength linear response, the end 28 of the core 24 may provide a signal that depends on the wavelength, while the end 27 provides a reference signal permitting the spectral characterization for example of the position of a fine emission ray in the analysis spectrum.

This coupler may be optimized, before the coupling element 30 is created; this may be used for balancing the two output ends 27 and 28.

FIGS. 8a to 8d show diagrammatically an example of an embodiment of a coupling element of the invention (for example that of FIG. 2) using ion exchange technology and masks.

These figures are cross sections in a plane perpendicular to the surface of the substrate and perpendicular to the direction x of propagation.

Figure 8A:
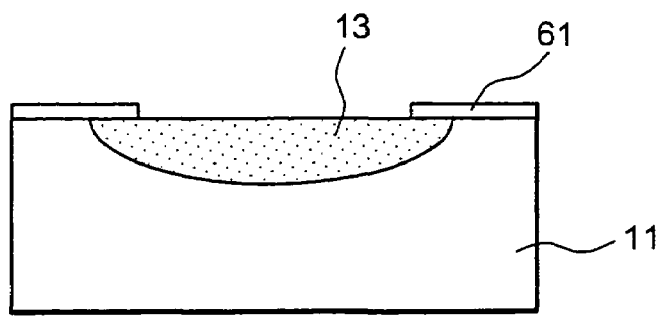

FIG. 8a shows the substrate 11 containing B ions.

A first mask 61 is created for example by photolithography on one of the faces of the substrate; this mask comprises an opening determined according to the dimensions (width, length) and the pattern of the cladding 13 that we wish to obtain. The mask 61 thus comprises the same modulations as those that one desired in the cladding.

A first ionic exchange is created between the A ions and the B ions contained in the substrate, in a zone of the substrate situated next to the opening of the mask 61. This exchange is obtained for example by soaking the substrate equipped with the mask in a bath containing A ions and by possibly applying an electrical field between the face of the substrate on which the mask is located and the opposite face. The zone of the substrate in which this ionic exchange takes place forms the cladding 13.

To bury this cladding, an A ion re-diffusion may be carried out with or without the use of an electrical field applied as previously described.

Figure 8B:
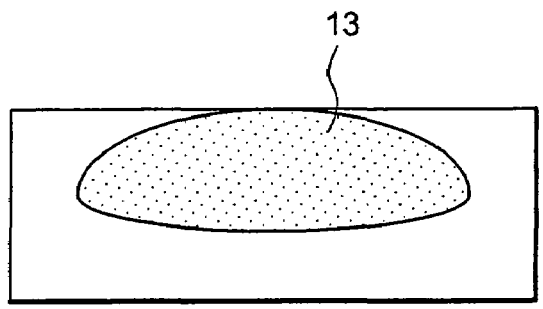

FIG. 8b, shows the cladding after it has been partially buried. The mask 61 is generally removed before partially burying the cladding.

The creation of the cladding of the invention is similar to the creation of a guide core but with different dimensions.

Figure 8C:
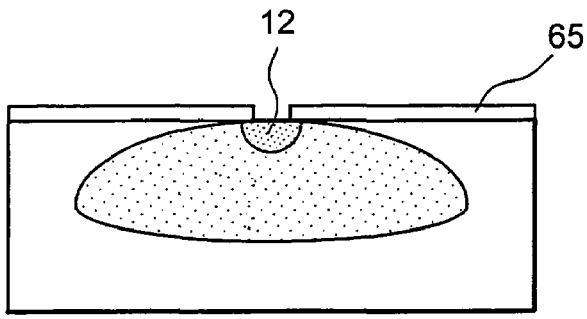

In FIG. 8c, a new mask 65 is formed on the substrate for example by photolithography after possibly cleaning the face of the substrate on which it is created. This mask comprises patterns configured to define the core 12.

A second ionic exchange is then created between the B ions of the substrate and the C ions which may or may not be the same as the A ions. This ionic exchange may take place as previously described by soaking the substrate in a bath containing C ions and by possibly applying an electrical field.

Figure 8D:
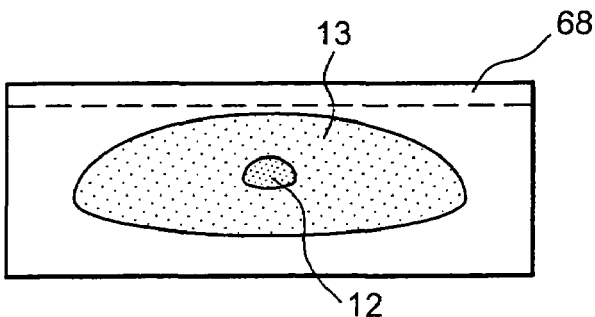

Finally, FIG. 8d shows the component obtained after burying the core 12 obtained by re-diffusion of the C ions and final burying of the cladding, with the use or not of an electrical field. The mask 65 is generally removed before this burying step.

The conditions of the first and second ionic exchanges are defined in order to obtain the differences of refractive indices desired between the substrate, the cladding and the core. The adjustment parameters of these differences may be the exchange time, the temperature of the bath, the concentration in ions of the bath and the presence or absence of an electrical field.

As an example of an embodiment, the substrate 11 is made of glass containing $Na^+$ ions, the mask 61 is made of aluminum and has an opening of around 30 μm wide and a modulation on the opening of between a few and several dozen micrometers (the length of the opening depends on the desired length of the cladding for the application in question).

The first ionic exchange may be carried out with a bath comprising $Ag^+$ ions at around 20% concentration, at a temperature of around 330° C. and for an exchange time of around 5 min. The cladding thus formed in the glass is then partially buried. This burying step is carried out by re-diffusion in a sodium bath at a temperature of around 260° C. The duration of the re-diffusion depends on the depth of burying desired for the final component. In this way, for a surface component a duration of around 3 minutes may be sufficient whereas for a buried component a duration of around 20 minutes may be selected. In this second case, it may be desirable to carry out the burying of the cladding under an electrical field before the second exchange. In this way, a current of 20 mA may be applied between two sodium baths on either side of the plate at a temperature of 260° C. for 10 minutes.

The mask 65 may also be made of aluminum and has a pattern opening of around 3 μm wide (the length of the pattern depends on the desired length of the core for the application in question).

The second ionic exchange may be carried out with a bath also comprising $Ag^+$ ions at around 20% concentration, at a temperature of around 330° C. and for an exchange time of around 5 min. Then the core thus formed is partially buried in the glass by re-diffusion in a sodium bath at a temperature of around 260° C. for 3 min. For a buried component, this re-diffusion may not be necessary.

The final burying of the cladding and the core may take place under an electrical field, with the two opposite faces of the substrate in contact with two baths (in this example sodium) capable of permitting a difference in potential to be applied between these two baths. For a surface component, a duration of less than one minute may be sufficient, in the case of a buried component a duration of around 30 minutes may be used, with the burying being carried out with a current of 20 mA at 240° C.

Many variants of the previously described process may be created. In particular, the burying steps of the cladding and the core may be carried out as previously described during 2 successive steps but they may also be carried out simultaneously in certain cases, with the core having an ionic concentration higher than that of the cladding, it is buried quicker than the cladding, which permits among others to centre the core in the cladding.

The difference in concentration between the core and the cladding is generally obtained either by re-diffusion in a bath of ions forming the cladding or by a difference in concentration of the ions introduced in acts a) and b).

As we have already seen, to bury the cladding and the core, a variant of the process consists of depositing on the substrate 11, a layer of material 68, shown in dotted lines in FIG. 8d. In order to make optical guiding possible, it is desirable that this material have a refractive index lower than that of the cladding.

Moreover, in this example, the cladding is created before the core, but it may be possible to create the core before the cladding.

The fabrication of the component of the invention is not restricted to the technique of ion exchange. The component of the invention may also be created by any techniques which permit the refractive index of the substrate to be modified.

Furthermore, as we have already seen, the period, size and position of the grating created, with respect to the core and the cladding, are parameters which can be adapted to suit the applications.

Figure 9A:
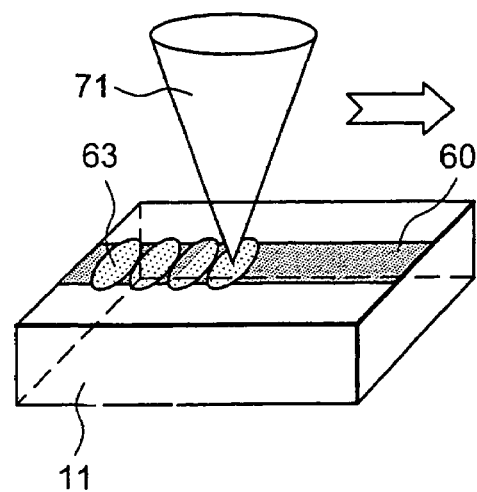
Figure 9B:
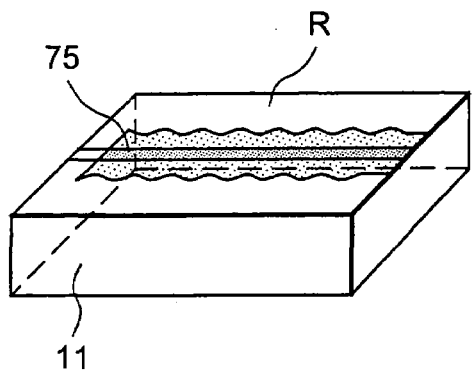

FIGS. 9a and 9b show in a perspective view a variant of an embodiment of a coupling element of the invention that does not use masks.

Thus, FIG. 9a shows the substrate 11 in which a cladding 60 with a uniform structure has been created beforehand, for example, by masking and ion exchange. Local heating 63 of the cladding may then be created using a laser beam 71 (for example a $CO_2$ type laser) aimed at the substrate. This beam is moved along the cladding, by intervals corresponding to the desired period of the grating. The local heating produces re-diffusion of the ions in the cladding, which results in both a change in section and index. The grating R is thus created in the cladding.

After this step (FIG. 9b), a guide 75 is fabricated in the cladding for example also by masking and ion exchange in order to obtain the coupling element of the invention.

In this example of the embodiment, the modulations of the cladding structure are obtained without modulating the cladding mask pattern. It is therefore possible to modify the opto-geometrical distribution of the cladding by simply creating periodic or pseudo-periodic localized heating. This heating can be obtained by all means permitting part of the substrate to be heated locally on a zone around the size of the desired grating period, following the direction of propagation of the modes. Laser exposure or an electrical arc may be used.

The exposure of the cladding to a laser beam may also be made after the guide core has been created.

Figure 10A:
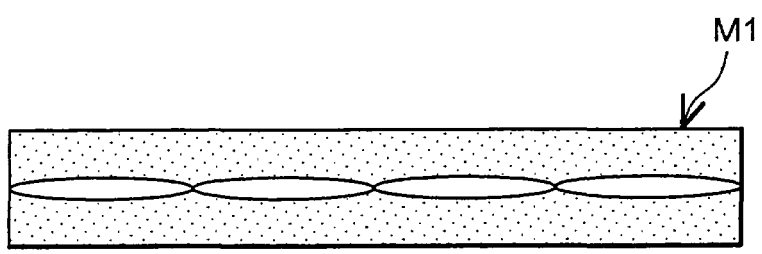
FIGS. 10a and 10b show examples of mask patterns configured to define a cladding having a modulated section.
Figure 10B:
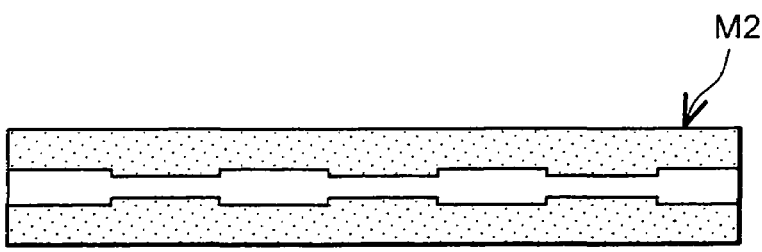

FIGS. 10a and 10b show diagrammatically examples of embodiments of the masks M1 and M2 permitting a cladding with section modulation to be obtained.

These figures are elevation views of the masks and only show the part of the masks permitting the grating to be obtained. The white zones of the mask patterns correspond to the openings of the masks.

These masks permit a periodic grating of period $\Lambda$ to be obtained by variation of the width of the patterns.

The invention claimed is:

1. A coupling element, comprising:
   a substrate;
   an optical guide core formed in said substrate; and
   an optical cladding formed in said substrate, said optical cladding being independent of the optical guide core and surrounding at least one portion of the optical core in a zone of interaction,
   wherein a structure defining the cladding is modulated at least in the zone of interaction so as to form a coupling grating between the optical guide core and the optical cladding, and
   wherein a refractive index of the cladding is different from a refractive index of the substrate and lower than a refractive index of the core at least in a part of the cladding adjacent the optical guide core in the zone of interaction.

2. The coupling element of claim 1, wherein a section of said structure is modulated.

3. The coupling element of claim 1, wherein a position of said structure with respect to the core is modulated.

4. The coupling element of claim 1, wherein said structure is modulated by ionic implantation, ionic exchange or local heating.

5. The coupling element of claim 1, wherein said coupling grating formed by modulation of said structure is an apodized grating.

6. The coupling element of claim 2, wherein the coupling grating formed by modulation of the section is a chirped grating.

7. A method for fabricating a coupling element, said coupling element comprising a substrate, an optical guide core, and an optical cladding formed in said substrate, said optical cladding being independent of the optical guide core and surrounding at least one portion of the optical core in a zone of interaction, the method comprising:
   modifying a refractive index of a substrate to form the optical guide core; and
   modifying the refractive index at least in a part of the substrate adjacent the optical guide core and at least in the zone of interaction to form the optical cladding,
   wherein a refractive index of the optical cladding is different from a refractive index of the substrate and lower than a refractive index of the optical guide core, and
   wherein a structure defining the optical cladding in the zone of interaction is modulated to form a grating.

8. The method of claim 7, wherein the refractive index of the substrate is modulated by radiation, by introduction of ionic species or both.

9. The method of claim 8, wherein the substrate includes glass, KTP, $LiNbO_3$ or $LiTaO_3$.

10. The method of claim 8, further comprising:
    a) exposing the substrate to a first ionic species,
    b) exposing the substrate to a second ionic species, and
    c) burying said first and said second ionic species to obtain the optical cladding and the optical guide core.

11. The method of claim 10, further comprising:
    defining a first mask comprising a first pattern configured to define the cladding, said first ionic species being introduced through said first mask,
    removing said first mask, and
    defining a second mask comprising a second pattern configured to define the optical core, said second ionic species being introduced through said second mask.

12. The method of claim 11, wherein the first pattern of the first mask is configured to define a modulation of said structure to form the grating.

13. The method of claim 11, wherein the first pattern of the first mask is uniform, and wherein said structure is modulated by local heating of the optical cladding.

14. The method of claim 10, further comprising:
    defining a mask comprising a pattern configured to define the optical cladding and the optical guide core, the first and the second ionic species being introduced through said mask, and
    locally heating said structure to modulate said structure.

15. The method of claim 11, wherein said first and second masks are made of chrome, alumina or dielectric material.

16. The method of claim 10, wherein said burying comprises depositing at least one layer of material with a refractive index lower than that of the cladding on the surface of the substrate.

17. The method of claim 10, wherein the burying comprises applying an electrical field to the substrate.

18. The method of claim 10, wherein the substrate includes glass and $Na^+$ ions, and wherein the first and second ionic species include $Ag^+$ or $K^+$ ions.

* * * * *